Sept. 12, 1944.      S. S. BARKER      2,358,043
PROCESS FOR DEWAXING POULTRY
Filed Nov. 27, 1941
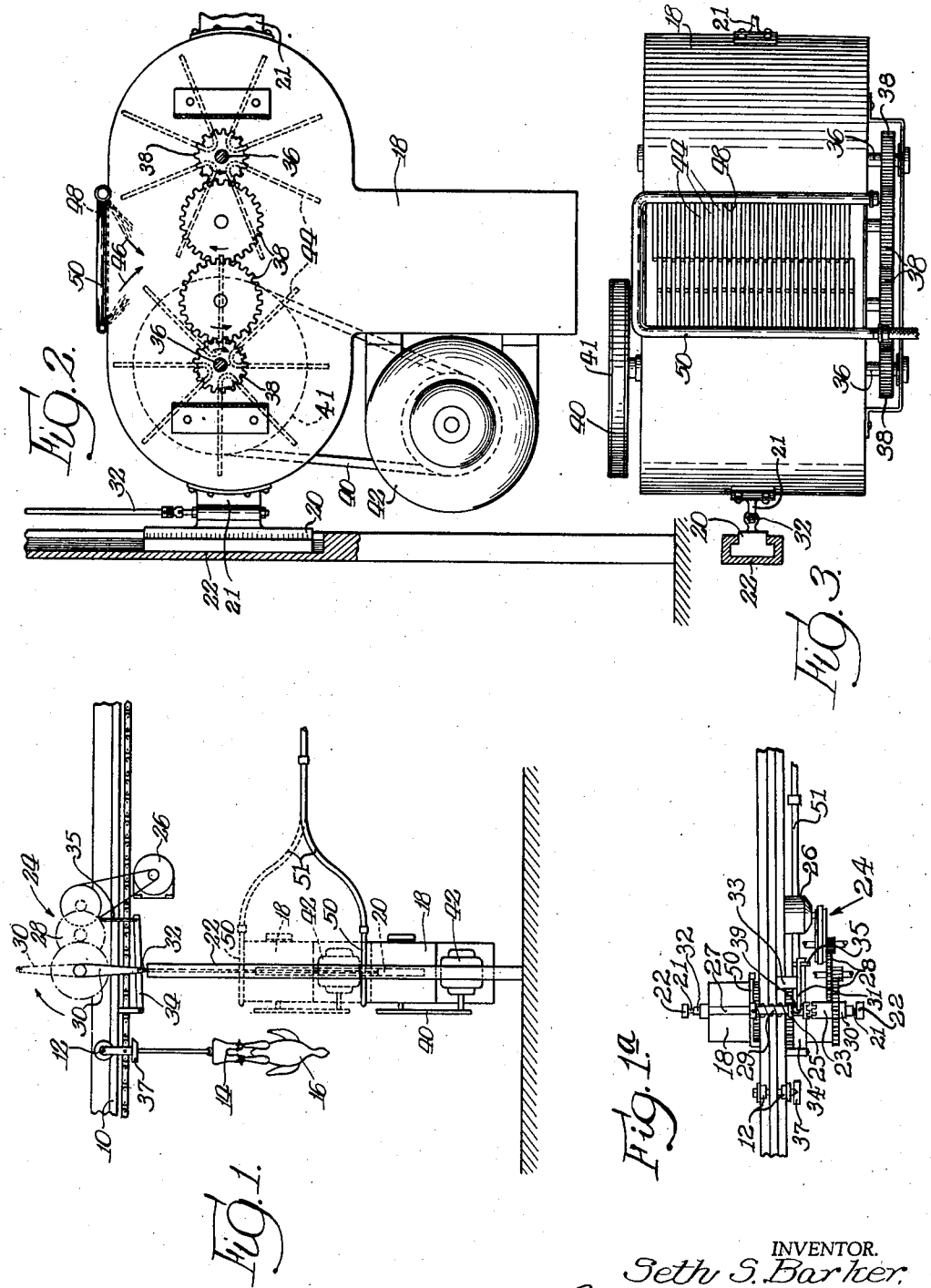
INVENTOR.
Seth S. Barker,
BY Bair & Freeman
Attys.

Patented Sept. 12, 1944

2,358,043

UNITED STATES PATENT OFFICE 2,358,043

PROCESS FOR DEWAXING POULTRY

Seth S. Barker, Ottumwa, Iowa

Application November 27, 1941, Serial No. 420,671

1 Claim. (Cl. 17—45)

My invention relates to a process for removing wax or similar material from poultry, together with the imbedded feathers. One form of apparatus which is capable of performing the process of this application is disclosed in my copending Patent No. 2,328,770, dated Sept. 7, 1943.

The patents to Bruce No. 1,960,048, issued May 22, 1934, No. 1,977,542, issued October 16, 1934, and No. 2,047,544, issued July 14, 1936, show apparatus for treating fowls by dipping them in a bath of melted wax, in which the feathers become imbedded. It has been customary in the poultry packing industry, as indicated in the patents referred to, to remove the wax from the birds by hand, after the wax has hardened. Operators have been employed to strip off the wax crust or coating, which brings with it the feathers, hair, dirt, etc., leaving the bird in clean and attractive condition ready for dressing. The wax method has the advantage of being a very quick one, and a very thorough one.

An object of my present invention is to provide a process whereby the wax or composition coating is removed from the poultry without the necessity for hand labor in performing the operation.

I have shown in the accompanying drawing one particular type of equipment with which my process may be carried out. The drawing is included however merely so that there may be a full and complete teaching of a manner of practicing my invention, and I do not mean to limit myself to performance of the process with the particular apparatus shown.

My process is particularly adapted for use in connection with poultry packing systems in which the birds are carried on an overhead conveyor line. The apparatus shown in the drawings represents an installation of this kind.

In the drawing—

Figure 1 is an elevational view looking at right angles to the line of the conveyor;

Figure 1a is a top view of the structure shown in Figure 1.

Figure 2 is an enlarged elevational view of the dewaxing apparatus proper, looking along the line of the conveyor, and Figure 3 is a top view of the dewaxing apparatus.

In the drawing, the numeral 10 indicates the conveyor line along which trolleys 12 are propelled at a uniform rate. Each trolley carries a shackle 14 on which the chicken or other fowl 16, covered with wax, is carried. The shackle 14 is suspended by suitable means, for example, rod or chain 13.

A tank or housing 18 encloses stripping rotors, which will be subsequently described in further detail. The housing 18 is supported by arms 21 on cross head blocks 20 sliding in vertical guides 22. At the top of the guides 22 is a crank assembly 24 including a motor 26, reducing gears 28 and a crank 30 on the shaft of the last gear.

The crank 30 is connected to the two cross head blocks 20 by connecting rod, cable or chain 32. The crank assembly 24 is provided either with a clutch or with a limit switch device operated by the contact bar 34, so that each trolley 12, as it comes over the housing 18, causes the crank 30 to make one complete revolution and then stop. As a diagrammatic illustration of the type of clutch mentioned I show, in Figure 1a, a clutch member 23 continuously driven by the slowest speed gear 28 and a cooperating clutch member 25 slidably and non-rotatably keyed on the shaft 27 to which the cranks 30 are secured. A spring 29 tends to engage the clutch member 25 with the clutch member 23, but the clutch member 25 is normally retained disengaged by a lever 31. This lever is pivoted to a bracket 33 and is connected by a link 35 with the bar 34. A shoe 37 on the trolley 12 depresses the bar 34 until the shoe passes over a shoulder 39 of the bar, and this raises the left end of the lever 31 so that the clutch members are permitted to engage. After the shoe 37 passes the shoulder 39 the bar 34 is swung upwardly by means of a spring or the like (not shown) and a cam on the clutch member 25 effects disengagement of the clutch. This construction is similar to a punch press clutch. This movement of the crank raises the housing 18 from the full line position of Figure 1 to the dotted line position, and then lowers it again to the full line position.

The crank is arranged so that in its normal inoperative position it rests at the lowest point of its stroke, as indicated in full lines. In the latter position the housing 18 is low enough so that the fowl may pass over it.

Inside the housing are two shafts 36 rotated by a suitable means such as gears 38, belt 40 and motor 42. Shafts 36 carry elongated hubs in which are mounted long fingers or whips 44 of rubber, leather or similar material.

The direction of rotation of the shafts is preferably that shown by the arrows 46, although, since the apparatus may be greatly modified, this is not essential.

An opening 48 in the top of the housing 18 may be surrounded with a perforated spray pipe 50, with spray openings arranged so that jets of water are directed downwardly into the housing.

The wax removing apparatus is located directly beneath the conveyor, and is shown with the shafts 36 parallel to the conveyor line. Just as a trolley carrying a fowl comes into position over the opening 48, it causes the crank operating mechanism to be tripped so that the housing 18 is raised to the dotted line position, where the fowl is brought between the rapidly revolving beater fingers 44. The wax is broken up and stripped off by the action of these fingers, and as the crank 30 continues its revolution, the housing 18 drops back down to its normal position, out of engagement with the bird, which may then pass on down the conveyor line without obstruction.

The fowl is almost completely enclosed while the stripping operation takes place so that the wax is all caught within the housing 18, and waste and loss of wax which commonly results in hand picking processes, is thus eliminated. Vertical movement of the stripping apparatus makes it possible to locate the opening in which the fowl is received in the top of the housing, this being the place where there is the least likelihood of material being thrown out to litter the floor of the processing room.

By the procedure just described, the dewaxing of the fowl can be carried out as it moves along the conveyor in the ordinary manner without any interruptions. Needless to say, however, my invention contemplates more than merely the use of apparatus such as that illustrated in the drawing. From the disclosure herein made, numerous modifications will be obvious to those skilled in the art, whereby various forms of apparatus can be employed for the removal of wax or composition coatings by subjecting the coated fowl to contact with a plurality of rapidly rotated flexible members.

Some changes may be made in the details of procedure involved in the practice of my method without departing from the real spirit and purpose of my invention, and it is my intention to cover by my claims any variant modes of procedure which may be reasonably included within their scope.

I claim as my invention:

The method of dewaxing poultry consisting of supporting the waxed bird on a horizontally moving conveyor, moving a stripping apparatus vertically up around the bird, and stripping off the wax by subjecting it to beating action by a plurality of rapidly rotating flexible fingers.

SETH S. BARKER.